(12) United States Patent
Boucheron et al.

(10) Patent No.: US 11,888,634 B2
(45) Date of Patent: Jan. 30, 2024

(54) DYNAMIC SHARING OF MEETING ASSETS WITHIN A MESSAGING PLATFORM

(71) Applicant: Zoom Video Communications, Inc., San Jose, CA (US)

(72) Inventors: Cécile Boucheron, Oakland, CA (US); Ganna Isayeva, Bellevue, WA (US); Sharvari Nerurkar, Redmond, WA (US); Yoshifumi Takebuchi, San Jose, CA (US); Junqing Wang, Hangzhou (CN); Yuchen Zhang, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 4 days.

(21) Appl. No.: 17/472,568

(22) Filed: Sep. 10, 2021

(65) Prior Publication Data

US 2023/0078154 A1 Mar. 16, 2023

(51) Int. Cl.
*H04L 12/18* (2006.01)
*G06Q 10/10* (2023.01)
*G06Q 10/1093* (2023.01)

(52) U.S. Cl.
CPC ..... *H04L 12/1831* (2013.01); *G06Q 10/1095* (2013.01); *H04L 12/1822* (2013.01)

(58) Field of Classification Search
CPC ............ H04L 12/1831; H04L 12/1822; G06Q 10/1095
See application file for complete search history.

(56) References Cited

U.S. PATENT DOCUMENTS

| | | | | |
|---|---|---|---|---|
| 11,386,381 | B2* | 7/2022 | O'Gorman | H04M 3/56 |
| 11,481,236 | B1* | 10/2022 | Weiss | G06F 3/0484 |
| 2003/0163537 | A1* | 8/2003 | Rohall | H04L 12/2874 |
| | | | | 709/206 |
| 2010/0223345 | A1* | 9/2010 | Gupta | H04L 65/1069 |
| | | | | 709/206 |
| 2016/0269254 | A1 | 9/2016 | Forney et al. | |
| 2018/0123814 | A1* | 5/2018 | Sexauer | H04L 12/1818 |
| 2020/0374146 | A1* | 11/2020 | Chhabra | H04L 12/1822 |

OTHER PUBLICATIONS

De Luca, "How to use Meeting Recap in Microsoft Teams [New feature]", YouTube, Available online at: https://www.youtube.com/watch?v=UTaH8Q3tg7A, Mar. 5, 2021, 4 pages.

(Continued)

*Primary Examiner* — Nazia Naoreen
(74) *Attorney, Agent, or Firm* — Kilpatrick Townsend & Stockton LLP

(57) ABSTRACT

Methods, systems, and apparatus, including computer programs encoded on computer storage media related to a method for dynamic sharing of meeting assets within a messaging platform. A communication system receives one or more meeting assets that are associated with a meeting that was conducted via a video communication platform. After the meeting has ended, the communication system generates a meeting summary component configured to be displayed within the messaging platform. The meeting summary component may include information describing the meeting and meeting assets. The meeting summary component may be posted into a messaging channel of the messaging platform.

23 Claims, 13 Drawing Sheets

(56) References Cited

OTHER PUBLICATIONS

Lacobellis, "How to use the Microsoft Teams Meeting Recap", YouTube, Available online at: https://www.youtube.com/watch?v=zbbDtl7wCqQ, Mar. 23, 2021, 7 pages.

PCT/US2022/041934, "International Search Report and Written Opinion", dated Dec. 9, 2022, 12 pages.

* cited by examiner

DYNAMIC SHARING OF MEETING ASSETS WITHIN A MESSAGING PLATFORM

FIELD OF INVENTION

The present invention relates generally to digital communication, and more particularly, to systems and methods for dynamic sharing of meeting assets obtained via a video communication platform to messaging channels of a messaging platform.

BACKGROUND

Digital communication tools and video communication platforms have been essential in providing the ability for people and organizations to communicate and collaborate remotely, e.g., over the Internet. In particular, there has been massive, adopted use of video communication platforms allowing for remote video sessions between multiple participants. Video communications platforms often provide functionality for video meetings and the sharing of attachments during the video meeting.

SUMMARY

With respect to meetings on such video communication platforms, there is currently no built-in system in place to share certain meeting assets after the meeting has ended, such as those digital files shared during the meeting, transcripts of the meetings, recordings of the meetings, whiteboard images, and more. If such meeting assets are shared within an in-meeting chat conversation in the video communication platform, the meeting assets are not accessible to meeting participants after a meeting has ended. In other words, meeting assets shared during a meeting using a video communication platform are usually not accessible to the meeting participants after the meeting terminates. Thus, there is a need in the field of digital communication tools and platforms to create a new and useful system and method for dynamically sharing meeting assets after the meeting has ended. The system and methods of the present disclosure overcome the existing problems by providing functionality for dynamically sharing and providing access to shared meeting assets after the meeting has ended.

In one embodiment, a communication system may be configured to perform a number of operations for sharing meeting assets within a messaging platform. The communication system receives one or more meeting assets associated with a meeting conducted via a video communication platform. The video communication platform allows meeting participants to share meeting assets, such as electronic files, electronic documents, image files, video files, audio files, textual meetings transcripts, word processing files, presentation files, .pdfs, computer code files, whiteboard files, hyperlinks, domain name links, and other such data or files that are commonly used within a computing environment. The communication system may store the meeting assets in an asset repository (such as remote cloud storage) for later retrieval after the meeting has ended. Meeting details and/or user account details of the meeting participants may be associated with the meeting assets and stored in the asset repository.

After the meeting has ended, the communication system may generate a meeting summary component configured to be displayed within a messaging platform. The meeting summary component may include references to and/or links for the retrieval of at least some or all of the meeting assets that were shared during the meeting. According to some embodiments, when a meeting conducted via the video communication platform has ended, a host participant of the meeting may post the meeting summary component to pre-existing or newly created messaging channels of the messaging platform. The messaging channels provide a persistent location for users to obtain previously shared meeting assets via the meeting summary component posted to the messaging channel.

In one embodiment, the communication system may generate and display a prompt to a host participant of meeting to post the meeting summary component to the messaging channel from which the meeting was originated. The communication system may receive a response to the prompt from the host participant confirming the posting of the meeting summary component. In response to receiving the selection, the summary component may be posted and displayed to the originating messaging channel of the messaging platform. Posting of the meeting summary component to the originating messaging channel allows users of the messaging platform to access and interact with the posted summary component to retrieve the meeting assets.

In another embodiment, the communication system may generate and display a prompt to a host participant of the meeting to post the meeting summary component to one or more existing messaging channels and/or to a newly created messaging channel of the messaging platform. The communication system may receive a response to the prompt selecting one or more pre-existing messaging channels or creating a new messaging channel. In response to receiving the selection, the summary component may be posted and displayed to the one or more selected messaging channels, or a newly created messaging channel.

In another embodiment, the communication system may automatically post the meeting summary component to a messaging channel of the messaging platform without requiring the involvement of the host participant. The communication system may automatically determine an overlap of meeting participants and messaging channel participants. The communication system may dynamically determine whether one or more existing messaging channels are associated with the meeting based on at least a comparison or evaluation of a subset of the participants of the meeting also being participants of the messaging channels. The communication system may then automatically post the meeting summary component to a messaging channel without requiring the involvement of the host participant.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for meeting assets collected via a video communication platform and distribution of the meeting assets via a messaging platform.

The present disclosure will become better understood from the detailed description and the drawings, wherein.

DETAILED DESCRIPTION

Figure 1A:
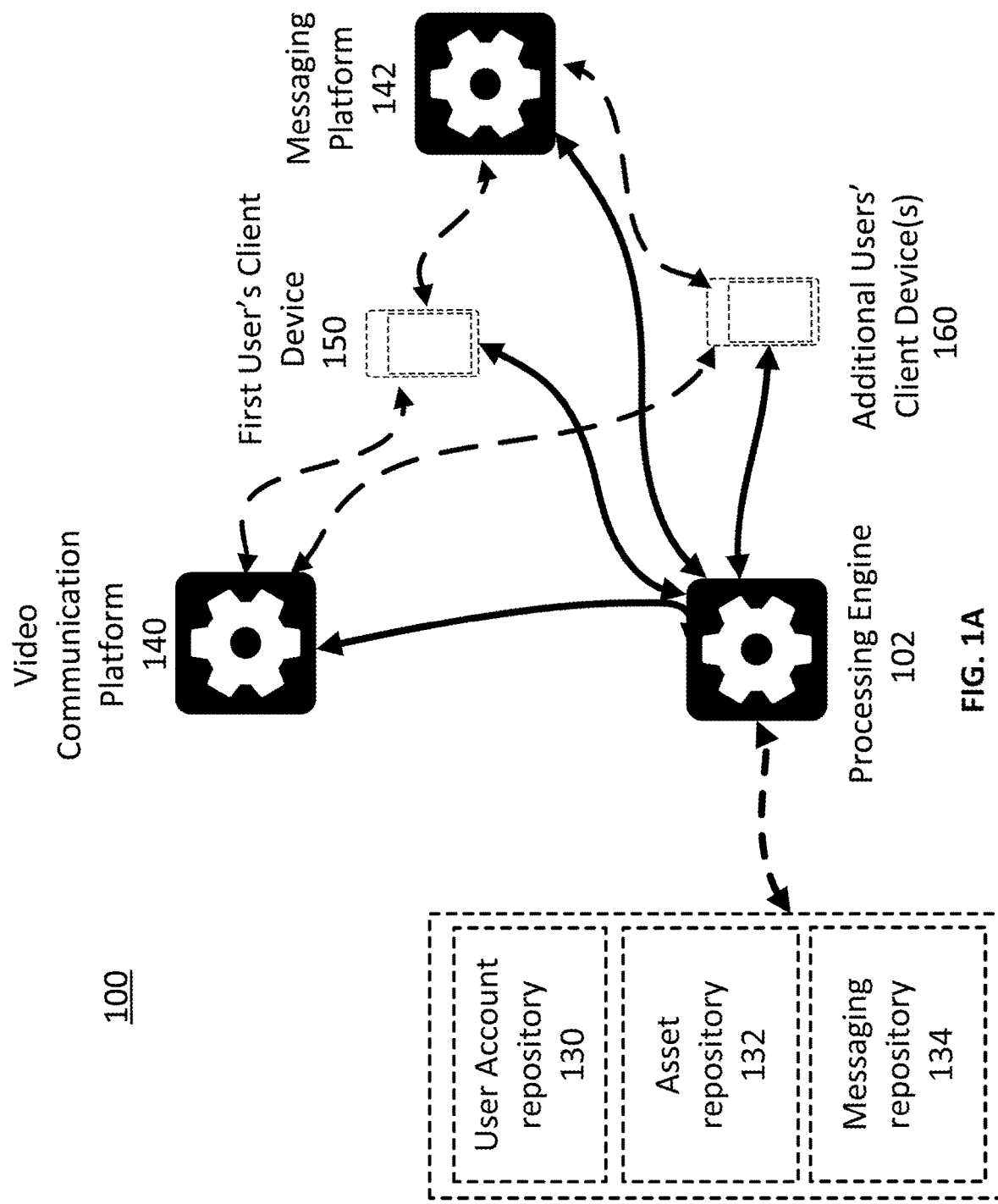
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a communication system. The communication system may include a processor, a memory, and a non-transitory computer-readable medium. The memory and non-transitory medium may store instructions for performing methods and steps described herein.

I. Exemplary Environments

FIG. 1A is a diagram illustrating an exemplary environment of a communication system 100 in which some embodiments may operate. The communication system 100 includes a video communication platform 140, a messaging platform 142 and processing engine 102 which interacts with the video communication platform 140 and the messaging platform 142. In the exemplary environment, a first user's client device 150 and one or more additional users' client device(s) 160 are connected to a processing engine 102 and, to a video communication platform 140 and a messaging platform 142. While the video communication platform 140 and the messaging platform 142 are depicted separately, these two platforms 140, 142 may be configured as a single platform acting together as one system.

The processing engine 102 is connected to the video communication platform 140 and the messaging platform 142, and connected to one or more repositories, file servers and/or databases, including a user account repository 130, an asset repository 132 and a messaging repository 134. In one embodiment, the processing engine 102 may be a service, agent or daemon configured to interact with the video communication platform 140 and the messaging platform 142.

One or more of the databases may be combined or split into multiple databases. The first user's client device 150 and additional users' client device(s) 160 in this environment may be computing devices (such as desktops, laptops, tablet device and/or mobile phones), the video communication platform server 140, the messaging platform server 142 and the processing engine 102 may be applications or software hosted on a computer or multiple computers which are communicatively coupled via remote server or locally.

The exemplary environment 100 is illustrated with only one additional user's client device, one processing engine, one video communication platform 140 and one messaging platform 142, though in practice there may be more or fewer additional users' client devices, processing engines, video communication platforms and/or messaging platforms. In some embodiments, one or more processing engines, video communication platforms and messaging platforms may be part of the same computer or device.

In an embodiment, the processing engine 102 may perform the methods 200, 300 or other methods herein, in whole or part. In some embodiments, this may be accomplished via communication by the processing engine 102 with the first user's client device 150, additional users' client device(s) 160, processing engine 102, video communication platform 140, messaging platform 142, the user account repository 130, the asset repository 132, the messaging repository 134 and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform portions of methods 200, 300 or other methods. In some embodiments, this may be accomplished via communication with the first user's client device 150, additional users' client device(s) 160, processing engine 102, video communication platform 140, messaging platform 142 and/or other device(s) over a network between the device(s) and an application server or some other network server.

The first user's client device 150 and additional users' client device(s) 160 are devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102, video communication platform 140 and/or messaging platform. The first user's client device 150 is configured to perform functions related to presenting and playing back video, audio, documents, annotations, and other materials within a video presentation (e.g., a virtual class, lecture, webinar, or any other suitable video presentation) on a video communication platform, and configured to perform functions related to receiving and transmitting textual and graphical messaging. The additional users' client device(s) 160 are configured to viewing the video presentation, and in some cases, presenting material and/or video as well, and configured to perform functions related to receiving and transmitting textual and graphical images. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, virtual assistant, virtual reality or augmented reality device, wearable, or any other suitable device capable of sending and receiving information. In some embodiments, the processing engine 102, video communication platform 140 and/or messaging platform 142 may be hosted in whole or in part as an application or web service and partially executed on the first user's client device 150 and/or additional users' client device(s) 160.

In some embodiments, optional repositories can include one or more of a user account repository 130, asset repository 132 and messaging repository 134. The user account repository 130 may store and/or maintain user account information associated with the video communication platform 140. In some embodiments, user account information may include sign-in information, user settings, subscription information, billing information, connections to other users, and other user account information. The asset repository 132 may store meeting assets and meeting details associated with meetings conducted via the video communication platform 140. In some embodiments, the asset repository 132 may be maintained by an administrator or specified user account related to particular meeting assets. The messaging repository may store chat or textual dialogue communicated during a meeting using the video communication platform 140.

In some embodiments, asset repository 132 may include one or more of following the meeting assets: electronic files, electronics documents, image files, video files, audio files, textual meetings transcripts, word processing files, whiteboard files, domain name links, and other such data or files that may be commonly used within a computing environment. The foregoing listing of meeting assets is for purposes of illustration and is not an exhaustive list of the types of meeting assets.

Video communication platform 140 is configured to facilitate video, audio, graphical and textual communication between two or more parties, such as within a conversation, "chat" (i.e., a chat room or series of public or private chat messages), video presentations, video conference or meeting, message board or forum, virtual meeting, or other form of digital communication.

Messaging platform 142 is configured to facilitate chat and textual messaging among users. The messaging platform may include persistent messaging channels for communication textual information to users associated with the messaging channels. A messaging channel allows a user to send to other users that have access to the messaging channel thereby providing convenient functionality to communicate messages to a user or a group of users. In one example, a messaging channel may be a channel for communicating messages for a particular topic or category. In another example, a messaging channel may be a chat channel for communication messages via one-to-one communication between only two users. In another example, a messaging channel may be a multi-user chat channel for communication messages via multiple users. In any of these examples, a messaging channel may provide for transmitting and receiving among users, textual messages, messages with emoji, icons or other graphics, messages with file attachments, and so forth.

Exemplary environment 100 is illustrated with respect to a video communication platform 140 and messaging platform 142, but may also include other applications such as audio calls, audio recording, video recording, podcasting, and so on.

Figure 1B:
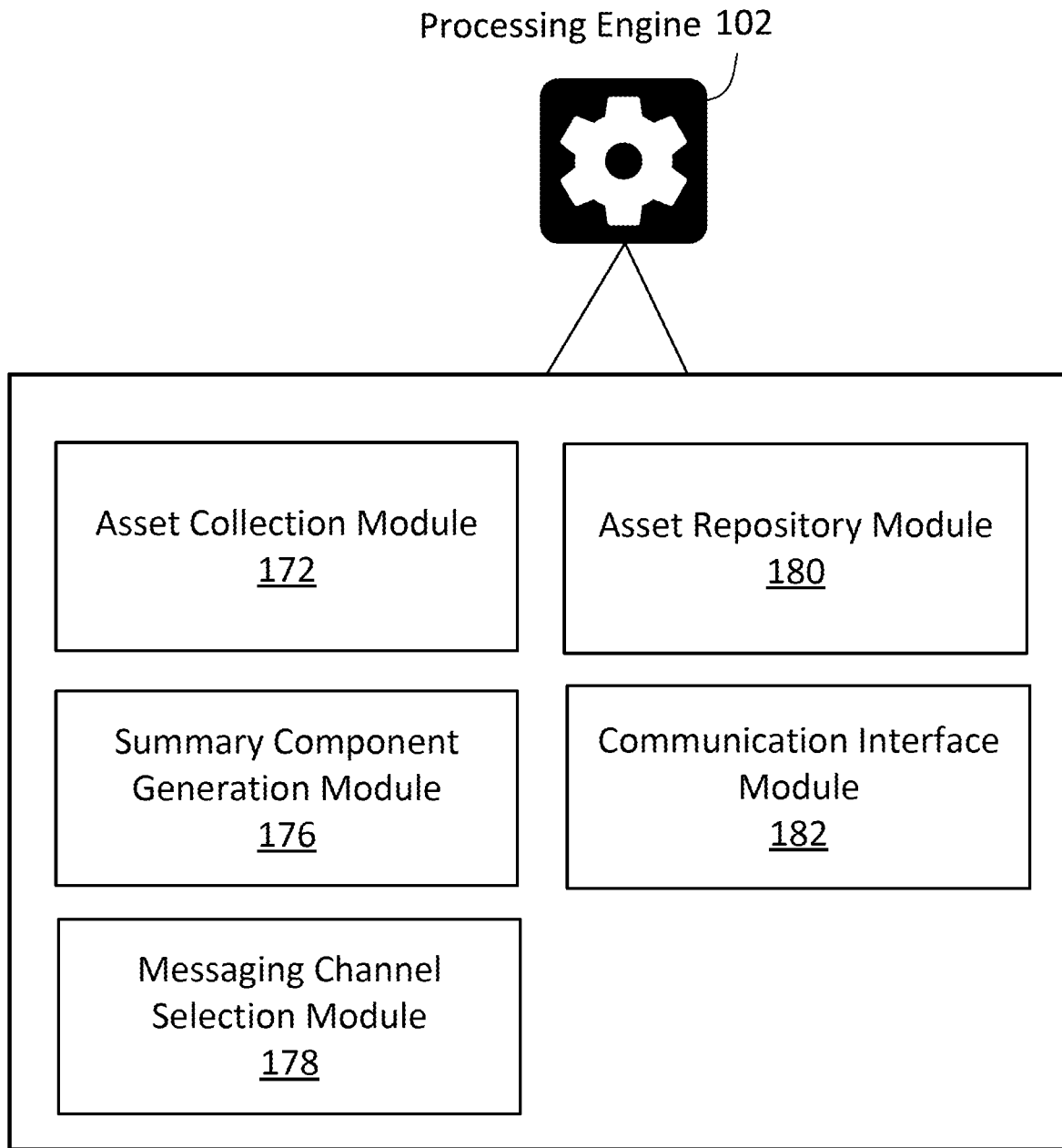
FIG. 1B is a diagram illustrating an exemplary communication system with software modules that may execute some of the functionality described herein.

FIG. 1B is a diagram illustrating an exemplary processing engine 102 including executed software modules that may perform some or all of the functionality described herein. The software modules may be performed in whole or part on different computing devices, such as remote servers and user computing devices. Some of the software modules include an asset collection module 172, a summary component generation module 176, a messaging channel selection module 178, an asset repository module 180 and a communication interface module 182.

The asset collection module 172 functions to collect and or generate meeting assets for a meeting. During the course of a meeting, the asset collection module 172 may receive meeting assets (such as meeting attachments) submitted to meeting participants. The asset collection module 172 may also automatically create meeting assets for a meeting, such as the creation of a video file of the meeting, the creation of an audio file of the meeting, the creation of a speech-to-text file of the meeting, the creation of white board files of the meeting and/or chat detail records of the meeting. The attachment collection module 172 interacts with the asset repository module 180 to store and retrieve the meeting assets to/from the asset repository 132.

The summary component generation module 176 functions to generate a meeting summary component that includes details of a meeting and provides access to meeting assets that are associated with the meeting. The meeting summary component may include one or more link(s) to download or access the meeting assets. In one embodiment, each of the meeting assets uploaded by meeting participants during a meeting are listed in the meeting summary component. Additionally, the name or user profile icon and/or the date/time stamp of when of the attachment was uploaded may be listed. The meeting assets may be listed in a chronological order of when the meeting assets were added to the meeting. This chronological listing provides users the ability to quickly select a particular meeting asset in the temporal order that the meeting asset was shared to meeting participants.

Additionally, the communication system 100 may receive an indication or tag of a priority or importance of an uploaded meeting asset. Higher priority or important meeting assets may be listed or displayed, via the meeting summary component, before other lower priority meeting assets. The summary component generation module 176 may list these higher priority or important meeting assets at the top of the listing of the meeting summary component. For example, a meeting asset may be a key presentation file shared among the meeting participants. This key presentation is indicated as being important. The key presentation may be listed before other lower priority meeting assets and/or may be displayed with a graphical indication of high importance. If any one of the meeting participants is interested in obtaining the key presentation file, the user may then easily scan the list of the multiple meeting assets, and then select the key presentation file for download by selecting a link to the key presentation file. In response to receiving a selection to the link, the communication system 100 would retrieve the selected presentation file from the asset repository 132, and then allow the meeting participant to store the file on the user's local or networked file system.

The meeting summary component may provide a link allowing a meeting participant to download all or individual meeting assets uploaded during the meeting or generated for the meeting. In response to receiving a selection of this link, the communication system 100 may retrieve meeting assets stored in the asset repository 132, and then package the meeting assets in a compressed packaged file (e.g., a zipped compressed file), and then allow the user to store the compressed packaged file on the user's local or networked file system.

The messaging channel selection module 178 functions to determine which pre-existing messaging channels a host meeting participant may post a meeting summary component. The messaging channel selection module may interact with the messaging platform 142 to identify available messaging channels.

The asset repository module 180 functions to control the storage and retrieval of meeting assets from the asset repository 172. The asset repository module 180 may encrypt/decrypt meeting assets using one or more cryptographic encryption/decryption techniques. Moreover, the asset repository module 180 may store the encrypted meeting assets in a temporary server, where the encrypted meeting assets are scheduled to automatically be deleted after a pre-specified storage window has expired.

The communication interface module 182 functions to display a communication interface at a client device 150, 160. The communication interface module 182 may generate and display the user interfaces described in the FIGS. 4, 5A-5J and 6B.

The above modules and their functions will be described below in further detail in relation to exemplary methods and user interfaces.

II. Exemplary Methods

In an example process, the communication system 100 may receive one or more meeting assets associated with a meeting conducted by a video communication platform 140. Upon terminating the meeting via the video communication platform 140, the processing engine 102 may generate a meeting summary component configured to be displayed within a messaging platform 142. The meeting summary component may list some or all of the meeting assets associated with the meeting.

In one mode of operation, the processing engine 102 determines a messaging channel to post the meeting summary component based on the messaging channel from which the meeting was originated. The processing engine 102 sends a prompt to a host participant of the meeting to post the meeting summary component to an originating messaging channel. The processing engine 102 receives a response to the prompt from the host participant, the response being a confirmation to post the meeting summary component to the originating messaging channel. Finally, the processing engine 102 posts and displays the meeting summary component to originating messaging channel.

In another mode of operation, the processing engine 102 determines if one or more existing messaging channels are associated with the meeting based on at least a subset of the participants of the meeting also being participants of the messaging channels. The processing engine 102 sends a prompt to a host participant of the meeting to post the meeting summary component to at least one messaging channel from a list of messaging channels, the list of messaging channels including any associated existing messaging channels and a new messaging channel associated with the participants of the meeting. The processing engine 102 receives a response to the prompt from the host participant, the response including one or more selected messaging channels. Finally, the communication system 100 displays the meeting summary component to the one or more selected messaging channels.

Figure 2:
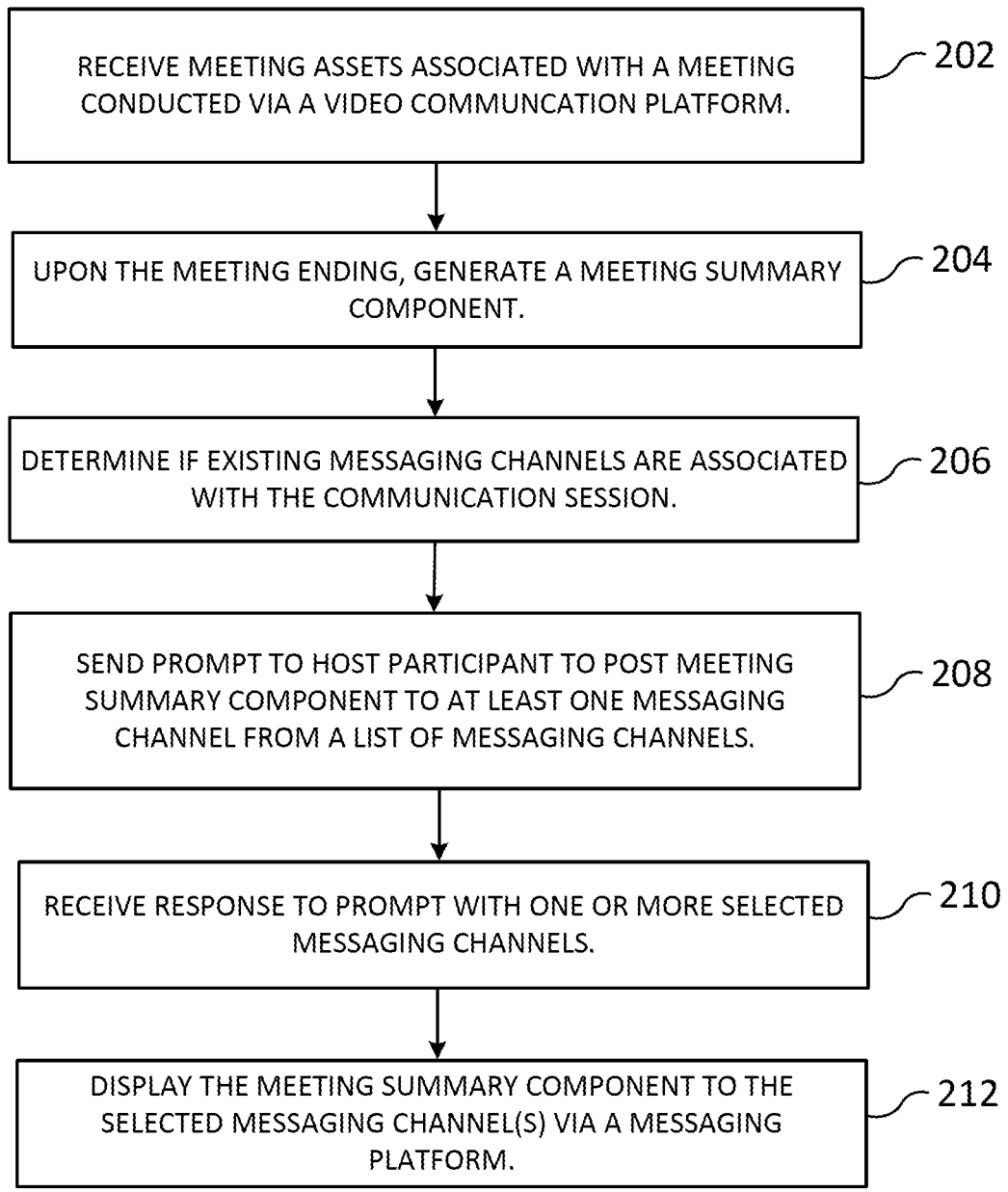
FIG. 2 is a flow chart illustrating an exemplary method 200 that may be performed in some embodiments.

Referring now to FIG. 2, a flow chart illustrates an exemplary method for posting meeting assets to a selected messaging channel. At step 202, the processing engine 102 receives one or more meeting assets associated with a meeting conducted via a video communication platform. The meeting assets include one or more electronic files, electronics documents, image files, video files, audio files, textual meetings transcripts, word processing files, whiteboard files, domain name links, and/or other such data or files that may be commonly used within a computing environment.

At step 204, the processing engine 102 determines that meeting has ended by receiving a notification from the video communication platform of the meeting terminating. The processing engine 102 generates a meeting summary component configured to be displayed within a messaging platform. The meeting summary component includes details about the meeting and at least one or more of the meeting assets.

At step 206, the processing engine 102 determines if one or more existing messaging channels are associated with the meeting based on at least a subset of the meeting participants of the meeting also being participants of the messaging channels.

At step 208, the processing engine 102 sends a prompt to a host participant of the meeting to post the meeting summary component to at least one messaging channel from a list of messaging channels. The list of messaging channels may include any associated existing messaging channels and a new messaging channel associated with the participants of the meeting.

At step 210, the processing engine 102 receives a response to the prompt from the host participant. The response includes a selection of one or more selected messaging channels.

At step 212, the processing engine 102 posts and displays the meeting summary component to the one or more selected messaging channels.

Figure 3:
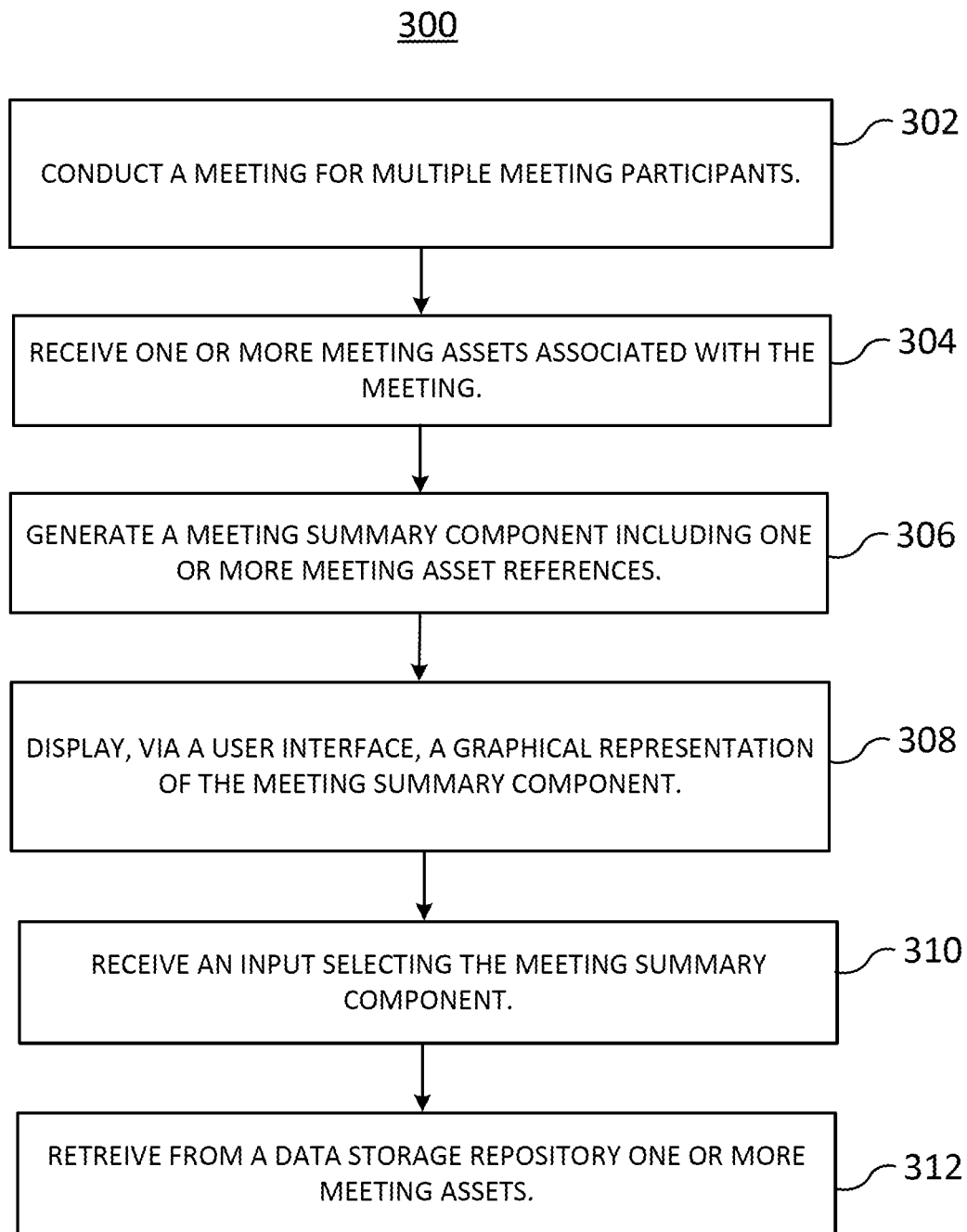
FIG. 3 is a flow chart illustrating an exemplary method 300 that may be performed in some embodiments.

Referring now to FIG. 3, the diagram illustrates a flow chart for a method of generating a meeting summary component and retrieving meeting assets associated with the meeting summary component. At step 302, the video communication platform 140 conducts or facilitates a meeting for multiple meeting participants. The video communication platform 140 provides functionality for user interface generation and network communication services to facilitate video, audio, textual and graphical communications among the meeting participants.

At step 304, the processing engine 102 receives meeting assets that are associated with the meeting. The meeting assets are stored in a storage repository for later retrieval. Additionally, the processing engine 102 may generate meeting assets. For example, the processing engine 102 may generate a video recording of the meeting, generate an audio recording of the meeting, generate a speech-to-text conversion file of the audio recording and/or generate a textual recording of chat messages. The processing engine 102 may automatically create meeting assets for these recordings and store them in the storage repository for later retrieval.

At step 306, the processing engine 102 generates a meeting summary component including references to one or more of the meeting assets. The meeting summary component may include a manifest or index of the meeting assets. The manifest or index may include references to locations where the meeting assets are stored (such as a URL linking to the stored attachment). Also, the manifest or index may include a meeting attachment identifier which may be used by the processing engine 102 to retrieve a stored meeting attachment based on the meeting attachment identifier.

At step 308, the processing engine 102 displays a graphical representation of the meeting summary component. As described herein, the meeting summary component, for example, may be posted and displayed in a messaging channel. A user interface may graphically display the meeting summary component with information about the meeting and the meeting assets (such as meeting date/time, meeting participants information and a listing of meeting assets).

At step 310, the processing engine 102 receives a user input selecting the displayed meeting summary component. Then at step 312, in response to the received input, the processing engine 102 retrieves from the storage repository the meeting assets using the attachment location or identifier from the manifest or index. The retrieved meeting assets may then be stored on the user's local file system.

Example User Interfaces

Figure 4:
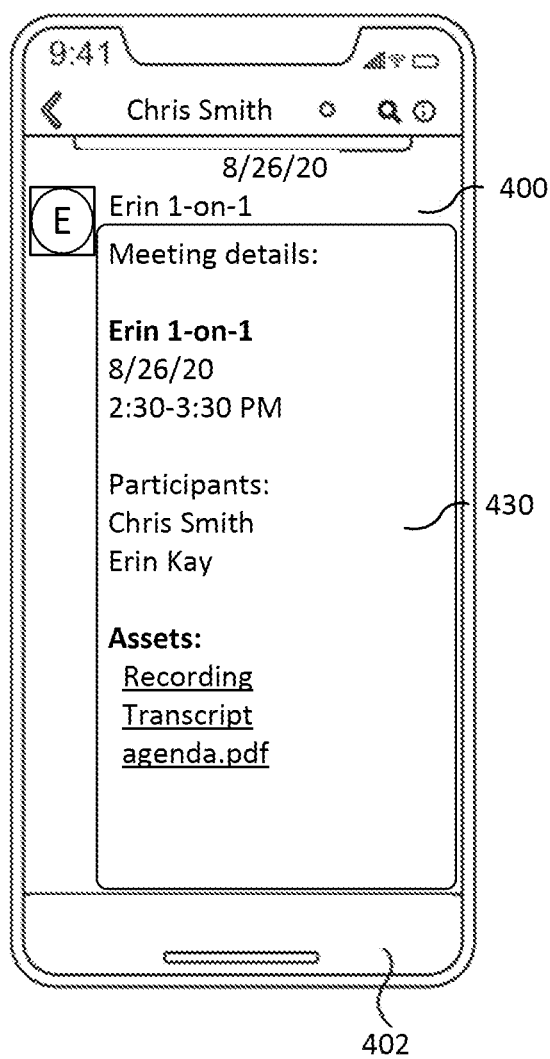
FIG. 4 is a diagram illustrating one example embodiment of an interface 400 for retrieving meeting assets from a meeting summary component.

FIG. 4 is a diagram illustrating one example embodiment of a meeting summary component 430 being shared to a one-on-one chat, according to some embodiments. By way of illustration, a user may wish to send meeting assets that were shared in a meeting to a one-on-one chat, multi-user chat channel, or a particular messaging channel after the meeting ends. After a meeting is ended by a host meeting participant, the communication system 100 may prompt the host to send these meeting assets via messaging channels such as a one-on-one chat with another meeting participant, a multi-user chat channel with meeting participants, or a chat channel where the meeting was started from (i.e., when users are in a chat and move to a meeting from within the chat). Additionally, after the meeting ends, a meeting summary component, may be displayed within a chat channel or one-to-one chat with the following details: meeting date, meeting start time, meeting end time, and a list of meeting participants with profile icons being displayed. The meeting summary component may also provide functionality for meeting participants to access the meeting assets through interacting with the meeting summary component. In some cases, an admin of the communication platform may have the ability to deploy the posting of a meeting summary component based on a configuration flag to select user accounts. This allows the admin to post a meeting summary component for the host participant.

Referring back to FIG. 4, meeting participants, Chris Smith and Erin Kay, have an existing one-on-one chat channel which they have been using to communicate prior to a meeting. Erin, acting as a host participant initiates a meeting with Chris. During the meeting, the attachment collection module 172 receives the respective meeting assets that are uploaded or shared by Chris or Erin. The asset repository module 180 may then transmit the received meeting assets to the asset repository 180. The communication system 100 may index the meeting assets with information related to a user account or user identifier that uploaded the meeting assets, a date/time stamp of when the meeting assets was uploaded by the user, and/or a unique meeting identifier associated with the meeting in which the users participate.

After the meeting has ended, the communication system 100 generates a prompt to Erin that a meeting summary component can be shared to one or more messaging channels (e.g., chat channels). Erin selects the one-on-one chat channel between Erin and Chris as the channel in which she wants the meeting summary component to be shared and selects that she would like the meeting assets to be shared and accessible via the meeting summary component as well, including a recording of the meeting that had been taken, an automatic transcription of the meeting, and a file shared by Erin via in-meeting chat called "agenda.pdf".

After Erin responds to the prompt, the communication system generates a meeting summary component 430, which is displayed within the existing one-on-one chat between Erin and Chris. The summary component generation module 176 generates a meeting summary component describing the details of the meeting. Some of the details that may be included in the meeting summary component include the meeting date, the meeting start and end time, a listing of each of the meeting participants (such as the user account name of each meeting participant, and/or a user profile icon representing the meeting participants.

The interface 400 shows the meeting summary component 430 being displayed in the one-on-one chat, as seen within a user device 402 being used by Chris. The meeting summary component 430 includes a meeting name, date, start time and end time, a list of participants, and links to access the shared attachments, including a recording, transcript, and the agenda.pdf file. Chris can interact with the links to access these shared attachments.

Figure 5A:
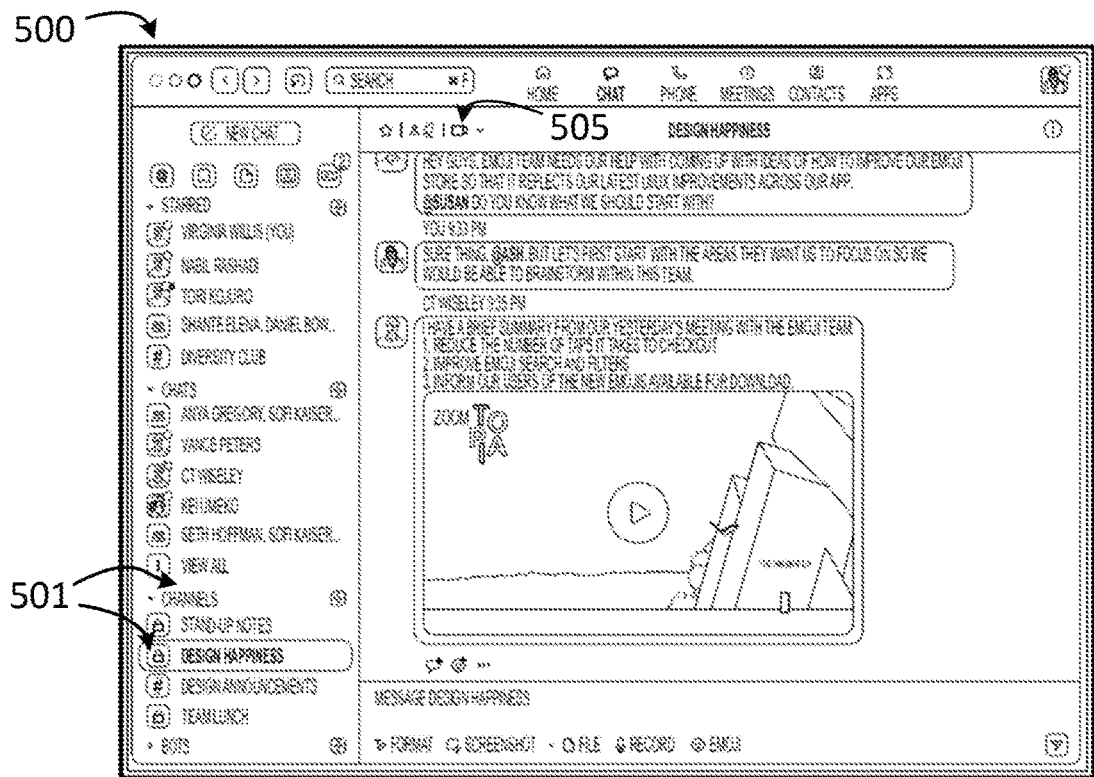
FIG. 5A is a diagram illustrating one example embodiment of a messaging interface 500 of messaging platform including messaging channels 501.
Figure 5B:
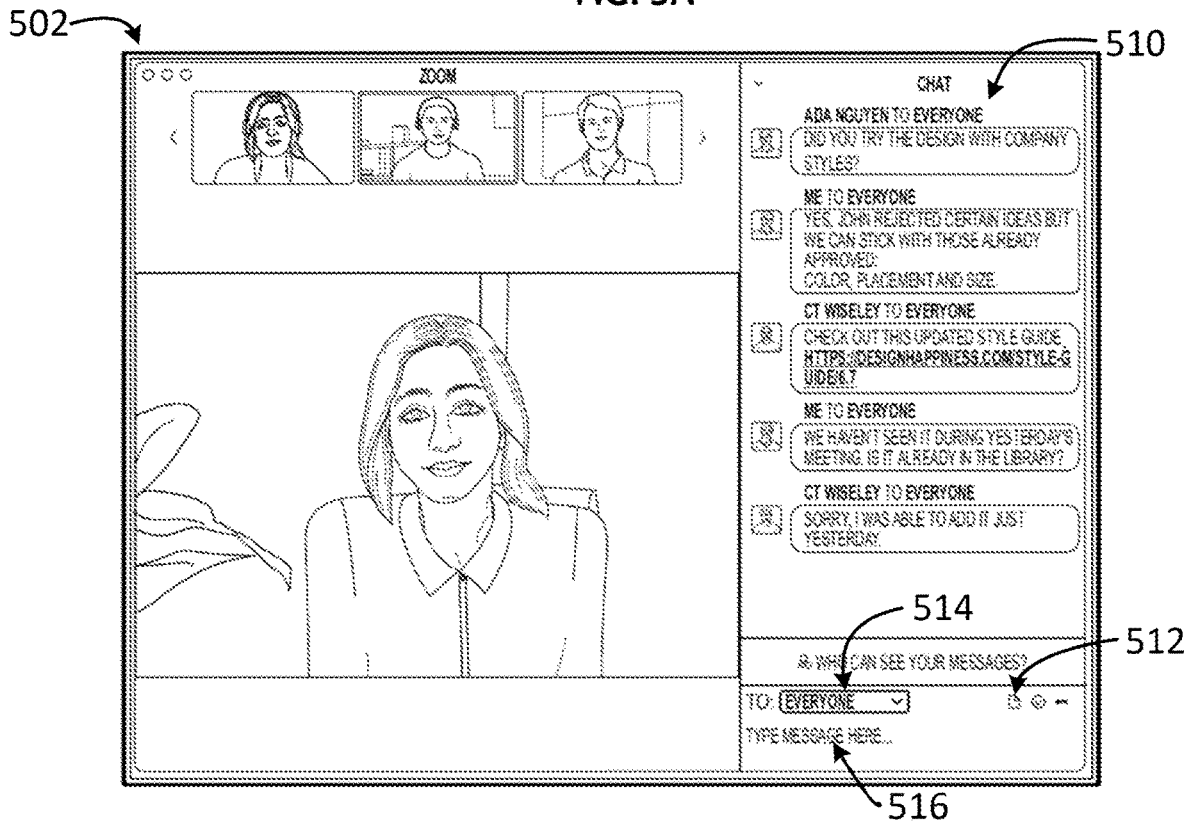
FIG. 5B is a diagram illustrating one example embodiment of a communication interface 502 of a video communication platform including a chat panel.
Figure 5C:
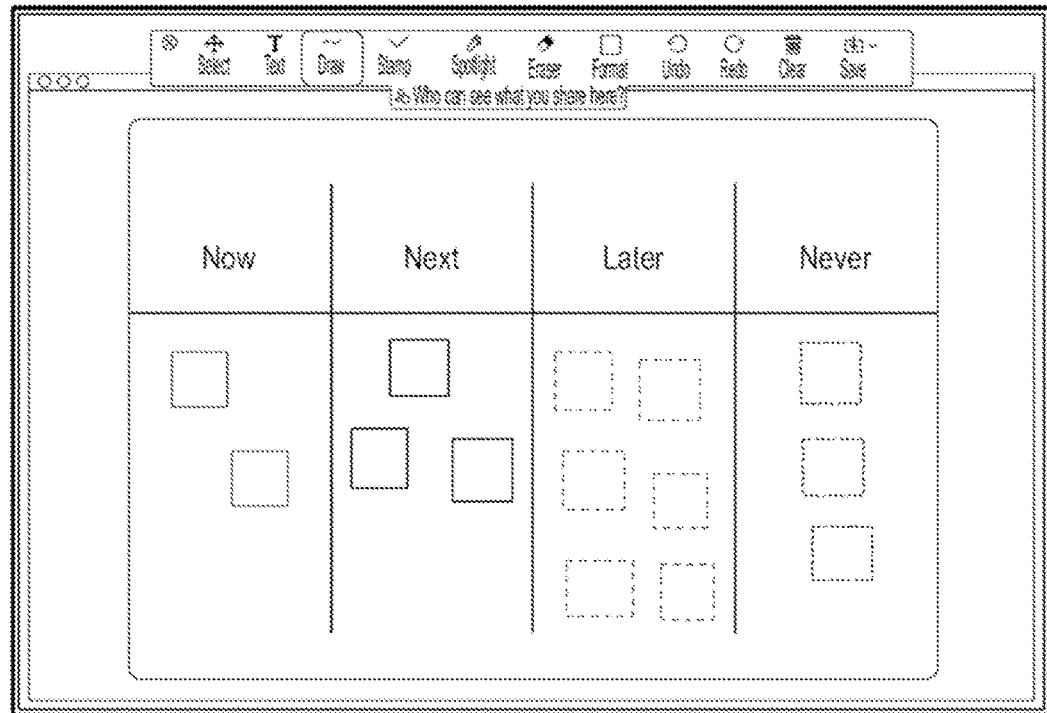
FIG. 5C is diagram illustrating one example embodiment of a whiteboard interface 506 of a video communication platform for collaboration among meeting participants.

Referring now to FIGS. 5A-5B, example user interfaces will be discussed where a host participant initiates a meeting from a messaging channel and various meeting assets may be uploaded and/or generated in association with the meeting. A host participant may initiate a meeting from a messaging interface 500. The messaging interface 500 includes multiple messaging channels 501 for receiving input and transmitting information among messaging channel participants. During the meeting, meeting participants may communicate with video, audio and graphics, and also share meeting assets. When the meeting is terminated by the host participant, a meeting summary component may then be generated by the processing engine 102 and posted to a messaging channel 501.

Referring to FIG. 5A, the diagram illustrates one example embodiment of a messaging interface 500 including messaging channels 501. The example messaging interface 500 provides functionality allowing users to communicate via message channels 501. The messaging interface may display a portion of the user interface 500 for different types of messaging channels.

One type of messaging channel is chat for one-on-one or multiple user chats for direct messaging among particular users (e.g., chats "Anya Gregory, Sofi Kaiser", "Vance Peters", "CT Wesley", etc.). Another type of messaging channel is a persistent channel for messaging (e.g., channels "Stand-up notes", "Design Happiness", "Design announcements", "Team lunch"). Multiple user accounts may be associated with a respective channel which allows those users to communicate via the channel. For example, user accounts that are associated (i.e., granted access or permission) to a particular channel may receive and/or send electronic communications (e.g., text messages, graphical messages, document attachments, etc.) via the channel.

In addition to serving as a messaging platform, the messaging interface 500 also provides functionality allowing a user to initiate a meeting directly from the messaging interface 500. For example, a host participant may select and invite other users to a meeting, or a host participant may initiate a meeting via a messaging channel 501. To initiate a meeting via a messaging channel, the messaging interface 500 receives a selection from a host participant for a particular messaging channel, and then the messaging interface 500 receives an input (such as receiving a selection of a video icon button 505) to begin the meeting. In response to receiving the input, the communication system 100 then invites those user accounts associated with the messaging channel to join the meeting. As used herein, a host participant is the user account that initiates a meeting. For example, the host participant (e.g., "Virginia Willis") may have selected the messaging channel "Design Happiness", and then invite user accounts associated with the "Design Happiness" to join a new meeting by selecting the video icon button 505.

Referring to FIG. 5B, the diagram illustrates one example embodiment of a communication interface 502 that includes a chat panel 510. The communication interface 502 may be part of the video communication platform 140. Communication interface 502 includes functionality for conducting the meeting and provides meeting participants functionality to communicate using video, audio, textual and graphical information. Video and audio information of the respective meeting participants may be captured via the individual participant's camera and microphone of their computing device. During the meeting, the meeting participants may also communicate to one another via messages using the chat panel 510. The chat panel 510 receives textual input from a user via input box 516 and then the system transmits the received textual input to the other meeting participants via a communication interface 502 displayed on the other users display device (such as laptop screen, monitor, tablet, mobile phone, etc.). The chat panel 510 may receive a selection via message recipient selector 514 to selection which participants can see the message entered and sent via input box 516. The chat messages sent via the chat panel 510 may be sent to everyone attending the meeting, or alternatively, sent directly to individual or groups of meeting participants.

During the meeting, the meeting participants may also attach and share documents among the meeting participants. The attachment collection module 172 receives the attachments and stores the attachments in the asset repository 180. The user interface 502 provides a selectable graphical user affordance, such as an icon or button, and provides functionality for a user to add meeting assets to the chat session. For example, the user interface 502 may include a graphical icon 512 that may receive a selection from meeting participant. In response to the user interface 502 receiving a selection of the graphical user affordance, the user interface 502 may display a dialogue or other window allowing the meeting participant to select meeting assets from their local file system or from another networked source The meeting participant then may select one or more of files to be uploaded to the meeting. Additionally, the communication system 100 allows the dragging and dropping of files from the local file system directly into the meeting. The processing engine 102 then retrieves the selected files from the source location. The user interface 502 then displays a representation of the selected files in the chat panel 510. The user interface 502 may also display a username and/or icon representing user, and a date and/or time stamp of when the file was uploaded to the meeting.

The communication interface 502 may also provide functionality allowing users to graphically collaborate with one another. For example, referring to FIG. 5C, the diagram illustrates the use of a whiteboard interface 506 where users participating in the meeting may share a "whiteboard" and annotate the whiteboard with graphics and text. The attachments collection module 172 collects the annotations and stores a file or other data representing the annotated whiteboard in the asset repository 180. After collaborating via the whiteboard, the meeting participants may return back to the communication interface 502.

Figure 5D:
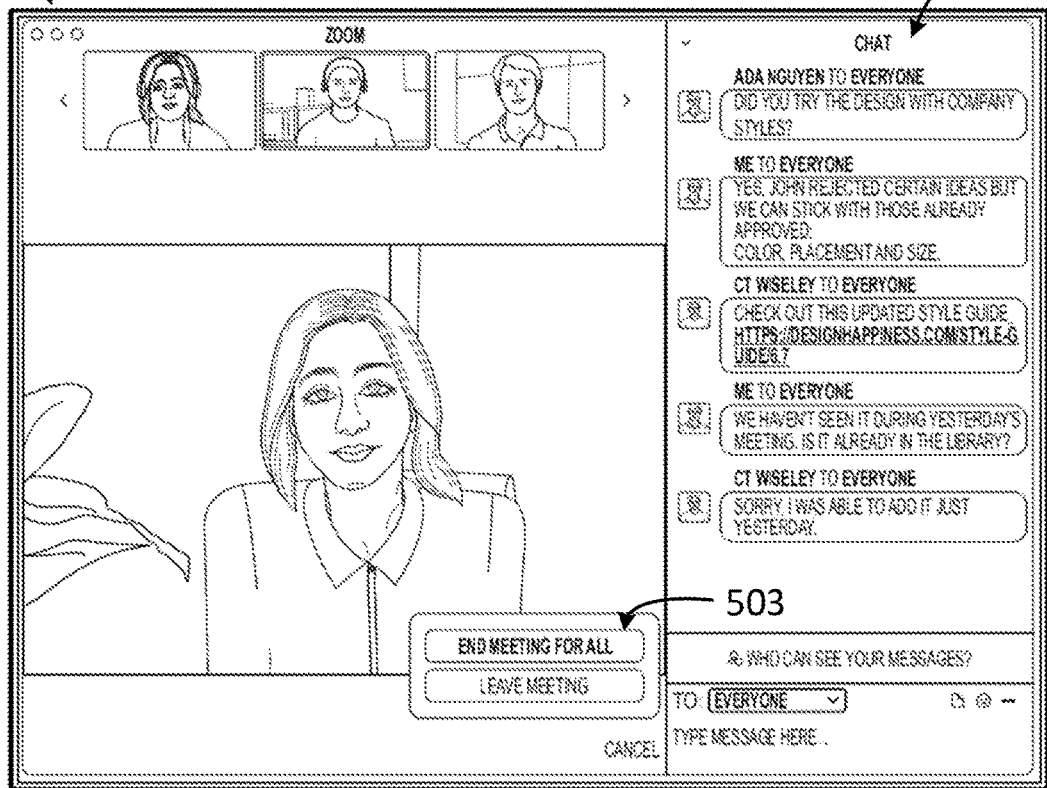
FIG. 5D is a diagram illustrating the example embodiment of the communication interface 502 of a video communication platform with a meeting termination option 503.

Referring to FIG. 5D, the diagram illustrates the example embodiment of the communication interface 502 with a meeting termination option 503. After conducting the meeting, the host participant may terminate the meeting by selecting the meeting termination option 503. Terminating the meeting ends the meeting for all of meeting participants. Before terminating the meeting and while the meeting is in progress, the processing engine 102 may record the video and audio communications (such as video of the meeting participants, screens shared by meeting participants, etc.).

Additionally, the processing engine 102 may convert audio to text thereby creating a textual transcript of the dialog or conversations spoken among the meeting participants. At intermittent times during the meeting, or when the meeting is terminated, the attachment collection module 172 may store the video files, audio files, speech-to-text files to the asset repository 180.

Also, the processing engine 102 may store and record, for later retrieval, the textual conversation or dialogue entered into the chat panel 510.

Figure 5E:
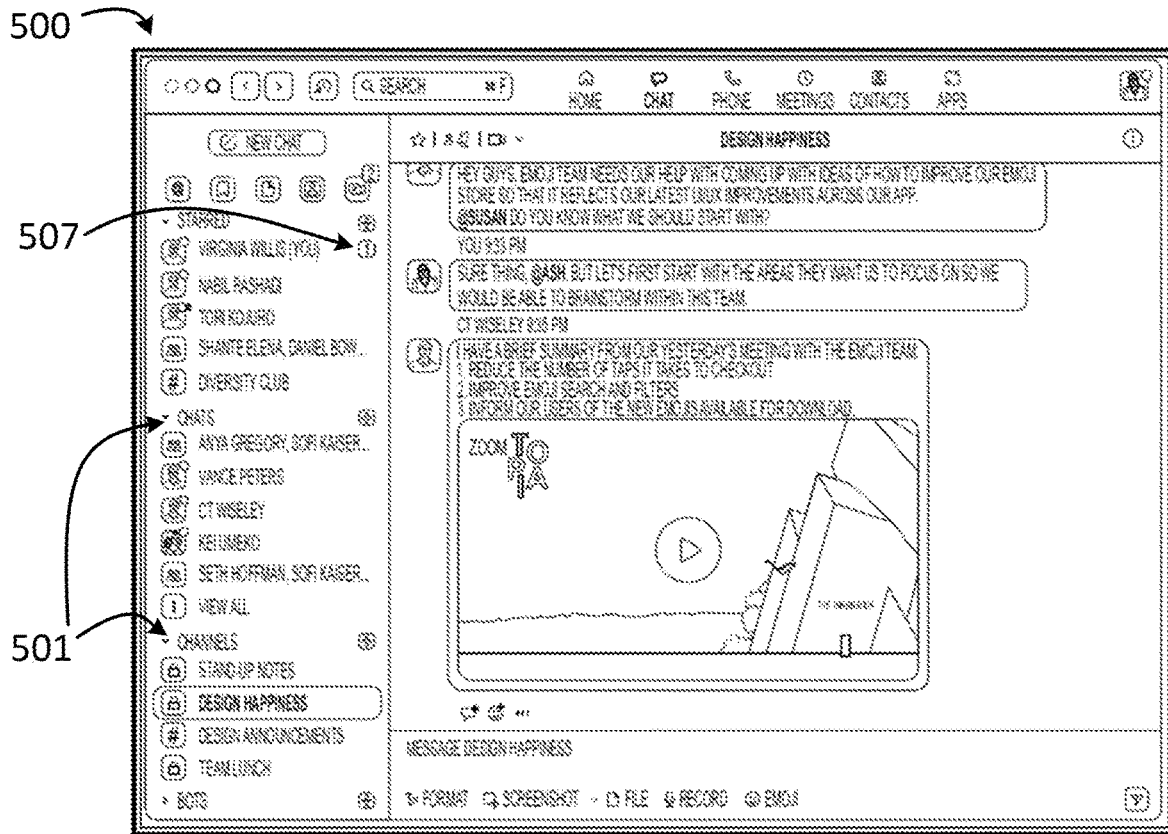
FIG. 5E is a diagram illustrating the example embodiment of the messaging interface 500 of a messaging platform including messaging channels 501.

Referring to FIG. 5E, the diagram illustrates the example embodiment of the messaging interface 500 including messaging channels 501. When the meeting is ended, the host participant may be returned to the messaging interface 500. The messaging interface may display an indication that a new meeting summary component has been created (e.g., via a badge icon 507 displaying a numeric indicator of the number of new meeting summary components that have been created by the host participant.) A notification may be provided to the host participant and may expire after a prespecified window of time if no action has been taken to post the meeting summary component.

Figure 5F:
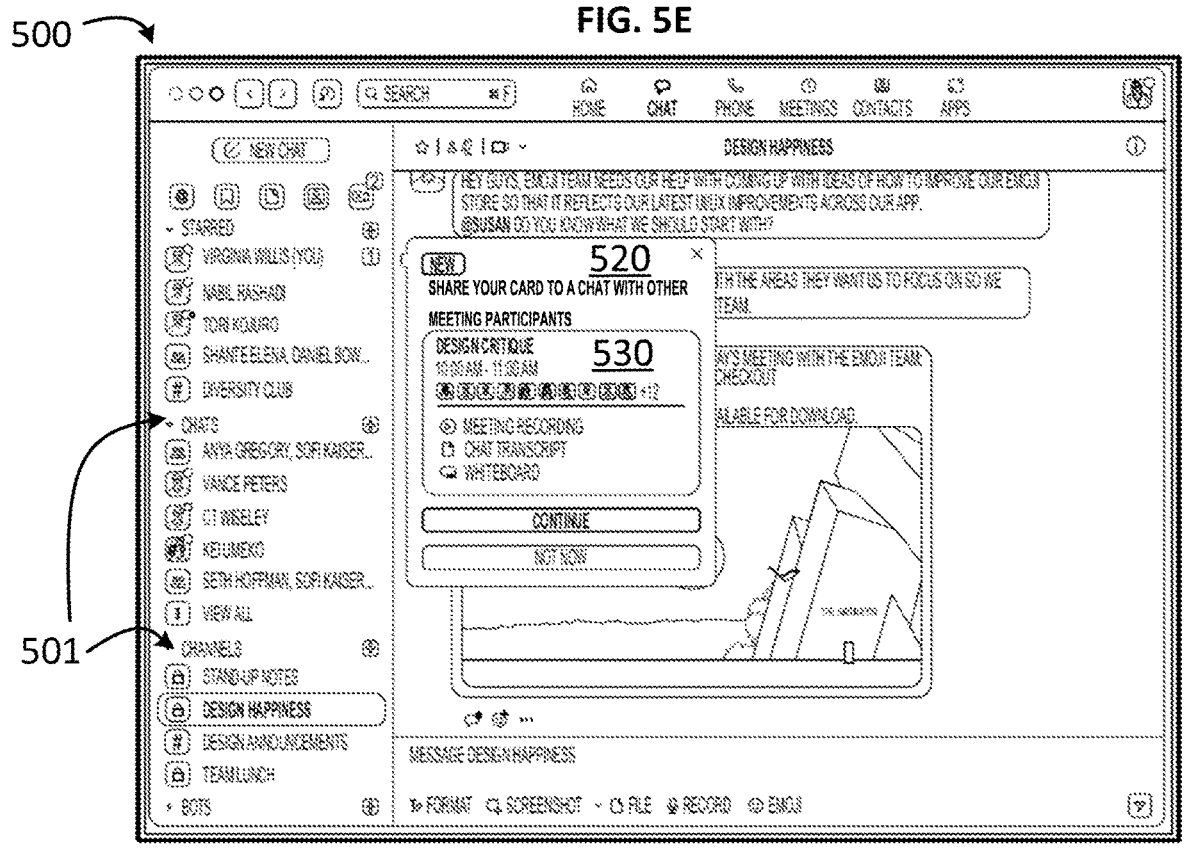
FIG. 5F is a diagram illustrating one example embodiment of the messaging interface 500 of a messaging platform including an interface 520 for posting a meeting summary component 530.

Referring to FIG. 5F, the figure is a diagram illustrates one example embodiment of the messaging interface 500 including an interface 520 for posting a meeting summary component 530. The messaging interface may receive a selection by the host participant (e.g., "Virginia Wolf") via receiving a touch input or mouse pointer placed over the badge icon. In response to receiving the selection, the messaging interface 500 may display the interface 520.

In one embodiment, the interface 520 identifies that a new meeting summary component is ready for sharing. For example, the interface 520 may just display a message that a meeting summary component is ready to be shared with other meeting participants. The interface may display "In-Meeting Materials Card" as a title, and note to "Share your card to chat with other meeting participants".

In another embodiment, interface 520 identifies that a new meeting summary component 530 is ready for posting to a messaging channel. For example, the interface 520 may display text such as "share your card to a chat with meeting participants". The interface 520 may display a graphical depiction of the meeting summary component 530 to be posted. The interface 520 provides a selection option of "Continue" and "Not Now". In response to receiving a selection of the "Continue" option, then the messaging interface 500 displays the interface 522 as described with reference to FIG. 5G. In response to receiving a selection of the "Not Now" option, the messaging interface face returns to the interface as depicted in FIG. 5E.

Figure 5G:
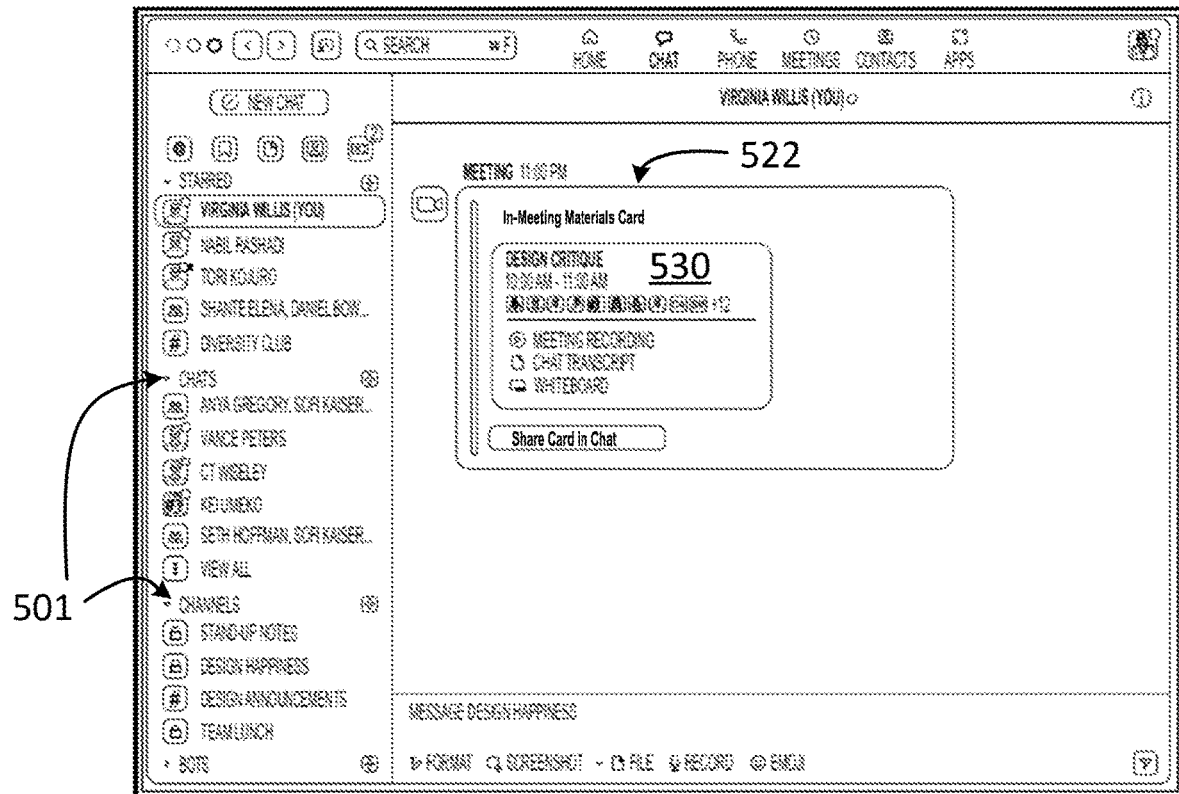
FIG. 5G is a diagram illustrating one example embodiment of the messaging interface 500 of a messaging platform including an interface 522 for posting a meeting summary component 530.

Referring to FIG. 5G, the diagram illustrates one example embodiment of the messaging interface 500 including an interface 522 for posting a meeting summary component 530. The interface 522 provides a selection option of "Share Card in Chat". In response to receiving a selection of the "Share Card in Chat" option, the processing engine 102 posts (e.g., shares) the meeting summary component 530 to the messaging channel from which the meeting summary component was originated. In the example, the meeting summary component for the meeting "Design Critique" was originated from the messaging channel "Design Happiness". The successful posting of the meeting summary component 530 is described with regard to FIG. 5I below.

Figure 5H:
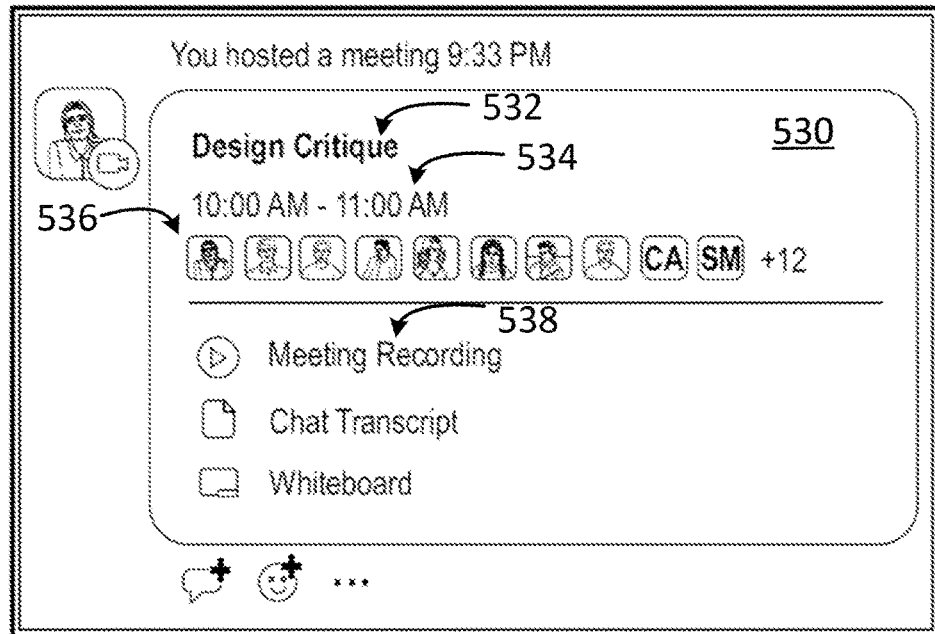
FIG. 5H is a diagram illustrating one example embodiment of an interface 530 representing a meeting summary component 530.

Referring to FIG. 5H, the diagram illustrates one example embodiment of an interface 530 representing a meeting summary component 530. The summary component generation module 176 generates a meeting summary component 130 which may be displayed by the communication interface module 182 in the form of a graphical card or other graphical form. The summary component generation module 176 interacts with asset repository module 180 which retrieves meeting information from the asset repository 132, including details about the particular meeting assets uploaded or created during or for the meeting. The summary component generation module 176 then processes this information to generate a meeting summary component 130 which includes summary and/or detail information about the meeting. For example, the meeting summary component 130 may a title of the meeting 532, a date/time of the meeting 534. The meeting summary component 130 may include icons 536 representing the meeting participants and/or a listing of the meeting participants by a user account name of a meeting participant. The meeting summary component 130 may also include a listing of meeting assets 5384 (such as a document manifest or index a listing of the attachments uploaded or created for the meeting). In this example, the title of the meeting is "Design Critique" which was from 10:00 AM-11:00 AM. Twenty-two participants attended the meeting (10 meeting participant icons are displayed with 12 more not shown, but accessible by selecting the "+12" graphic). The meeting assets 538 listed and retrievable via the meeting summary component are a meeting record (e.g., a video recording of the "Design Critique" meeting, a chat transcript (e.g., a transcript of the chat messages sent to meeting participants during the course of the meeting), and a white board file (e.g., a file of images, video and/or other data describing the graphical collaboration among meeting participants via the white board function as described with regard to FIG. 5C).

Figure 5I:
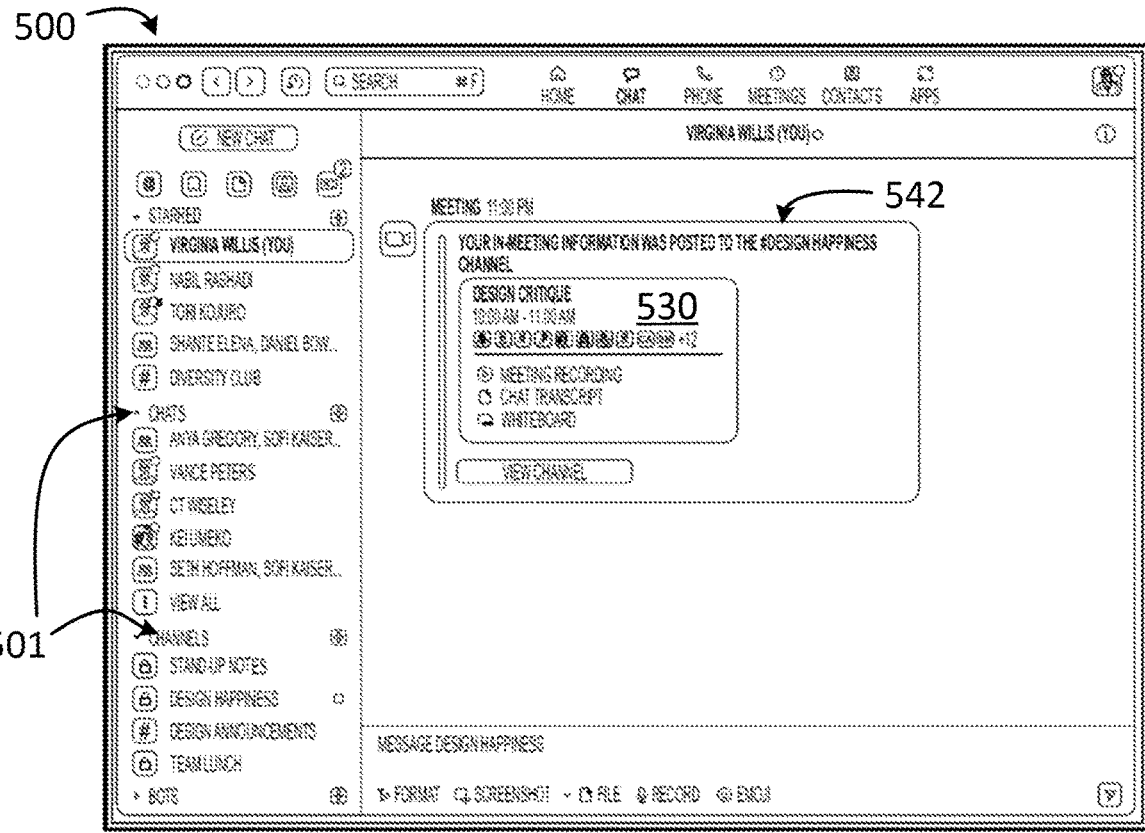
FIG. 5I is a diagram illustrating one example embodiment of the messaging interface 500 of a messaging platform including an interface 542 confirming posting a meeting summary component 530.

Referring to FIG. 5I, the diagram illustrates one example embodiment of the messaging interface 500 including an interface 542 confirming posting a meeting summary component 530. Interface 542 displays a graphical representation of the meeting summary component 530, and a successful posting message to the originating messaging channel (e.g., "Design Happiness"). In this example, the successful posting message is described as "Your in-meeting information was posted to the #Design Happiness channel". The interface 542 display a selection option to "View Channel". In response to receiving a selection of the "View Channel" option, the messaging interface will display the originating messaging channel which displays the posted meeting summary component 530 (as described with regard to FIG. 5J). Alternatively, the host meeting participant may select the particular "Design Happiness" messaging channel from the left-side portion of the messaging interface 500.

Figure 5J:
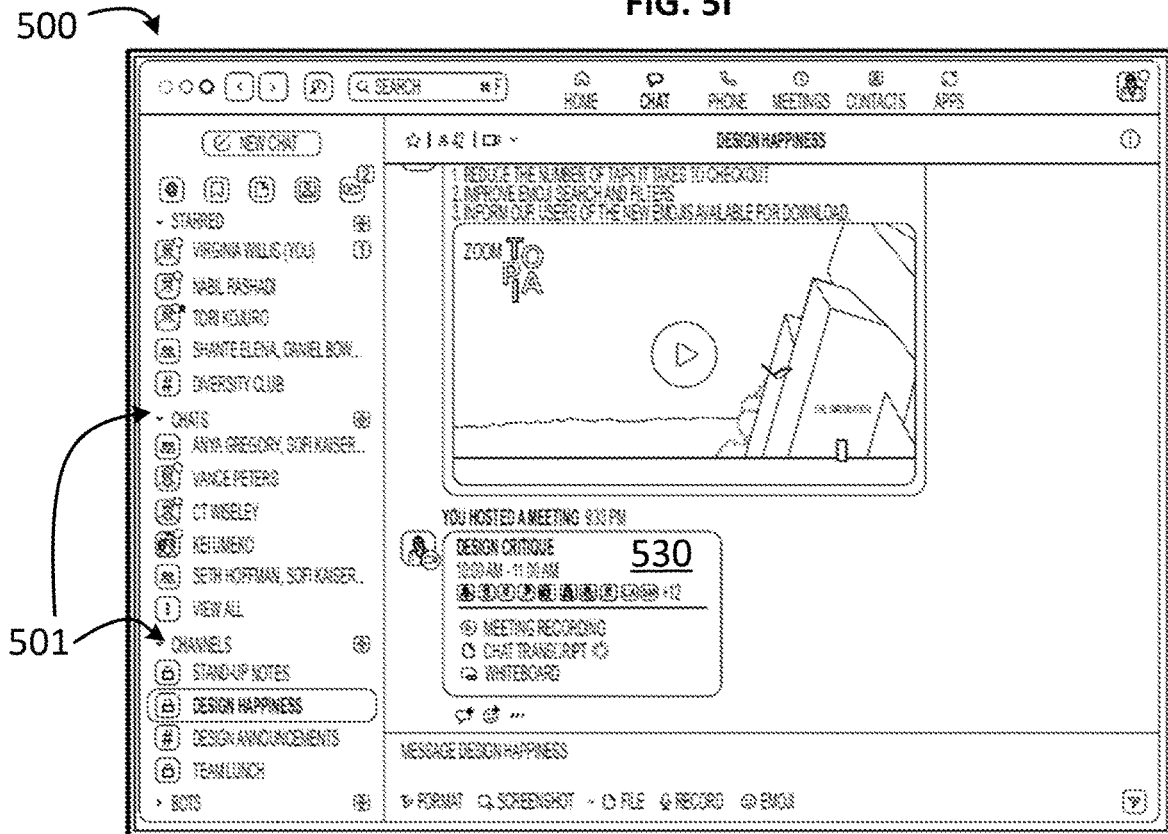
FIG. 5J is a diagram illustrating one example embodiment of the messaging interface 500 of a messaging platform showing a meeting summary component 530 posted in a messaging channel 501.

Referring to FIG. 5J, the diagram illustrates one example embodiment of the messaging interface 500 showing a meeting summary component 530 posted in a messaging channel 501. The meeting summary component 530 is depicted as being graphically posted into the selected messaging channel. The communication interface module 182 may generate and graphically depict the meeting summary component 510 as a card or other graphic with a listing of items. After the meeting summary component 530 is posted to the selected messaging channel, the meeting summary component 530 would be displayed as entry into the selected messaging channel. Users having access to the selected messaging channel 501 (e.g., "Design Happiness), may then access the meeting summary component via messaging interface 500. The messaging interface 500 may receive a user selection on or about a displayed meeting summary component 530. In one mode of operation, in response to receiving the selection, the processing engine 102 would retrieve the from the asset repository the meeting assets identified in the document manifest and download the documents to the user's computing device.

Figure 5K:
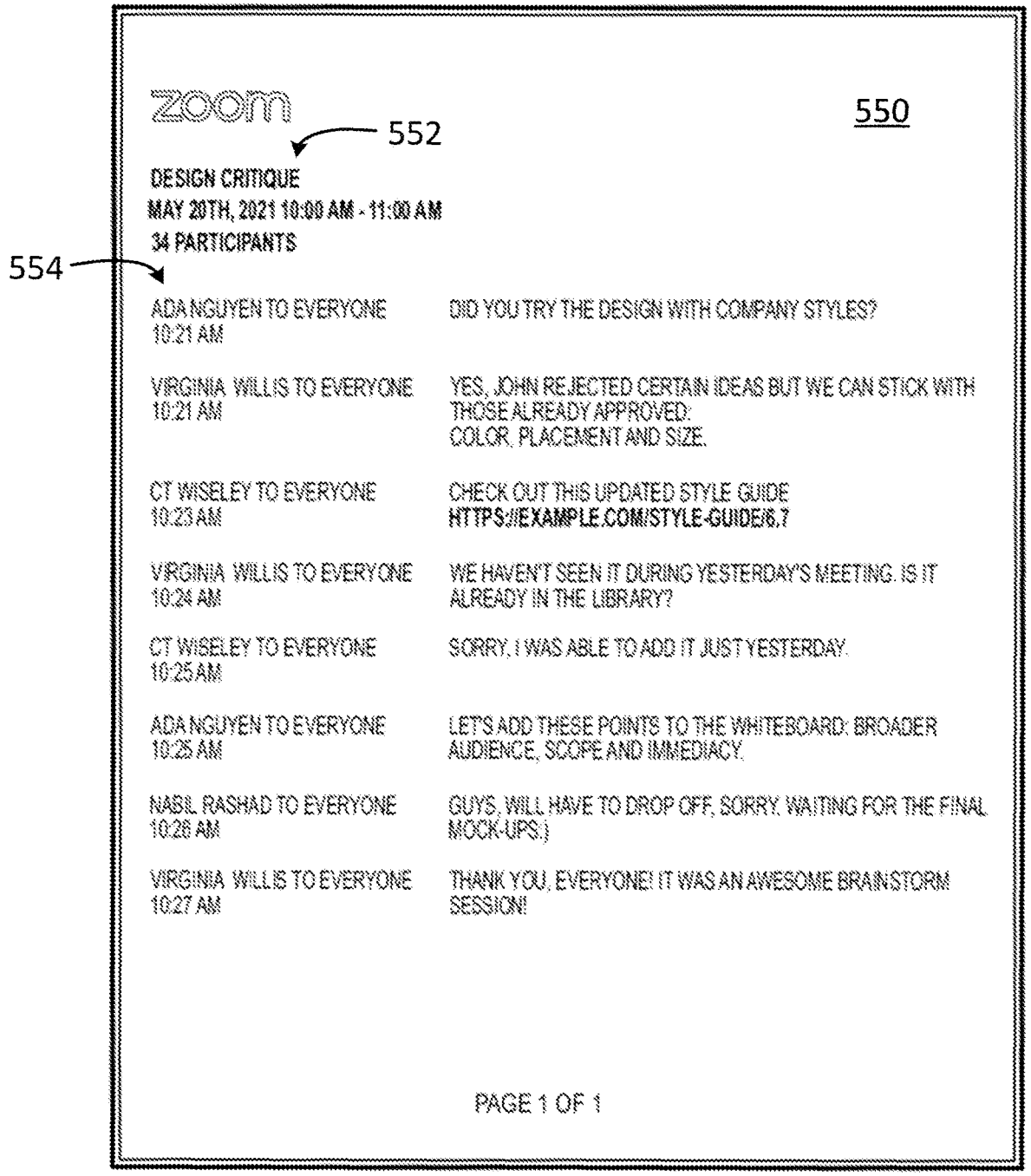
FIG. 5K is a diagram illustrating one example embodiment of an electronic document identifying meeting details 552 and a textual chat record 554.

In some embodiments, once the meeting summary component 530 is posted in the messaging channel 501, the meeting summary component may be copied and pasted and otherwise shared to other messaging platform users via other messaging channels, direct one-on-one chat channels or via multi-channel chat channels. In one example, the system may automatically grant or authorize other user access to the meeting assets of the shared meeting summary component. In another example, while the meeting summary component may be visually displayed to other users (e.g., non-meeting participants), the system does not automatically grant access to the meeting assets. Instead, when a non-meeting participant accesses the shared meeting summary component, a request is sent to the host participant requesting access. The system may receive a response from the host participant granting access to the requesting non-meeting participant, who then would have access to the authorized meeting assets. Referring to FIG. 5K, the diagram illustrates one example embodiment of an electronic 550 document identifying meeting details 552 and a textual chat record 554. In this example, the communication system 100 may generate an electronic document (such as a .pdf) describing meeting details 552 (e.g., a title of the meeting, a date/time of the meeting, and the number of meeting participants). The electronic document 550 may be included as part of the meeting summary component 530, and thereby retrievable by the meeting participants. The electronic document 550 may list a textual description of the chat dialogue 554 that occurred among meeting participants. The textual description may identify the participant that submitted a chat message and the time that the chat message was submitted in the chat panel 510. Additionally, the textual description my describe the particular chat message that was submitted. The processing engine 102 may filter or list only those chat message that were submitted to everyone (i.e., a chat message that was sent to all of the meeting participants). Those chat messages sent directly to individual participants, or a subset of the meeting participants may be precluded from being listed on the electronic document.

Figure 6A:
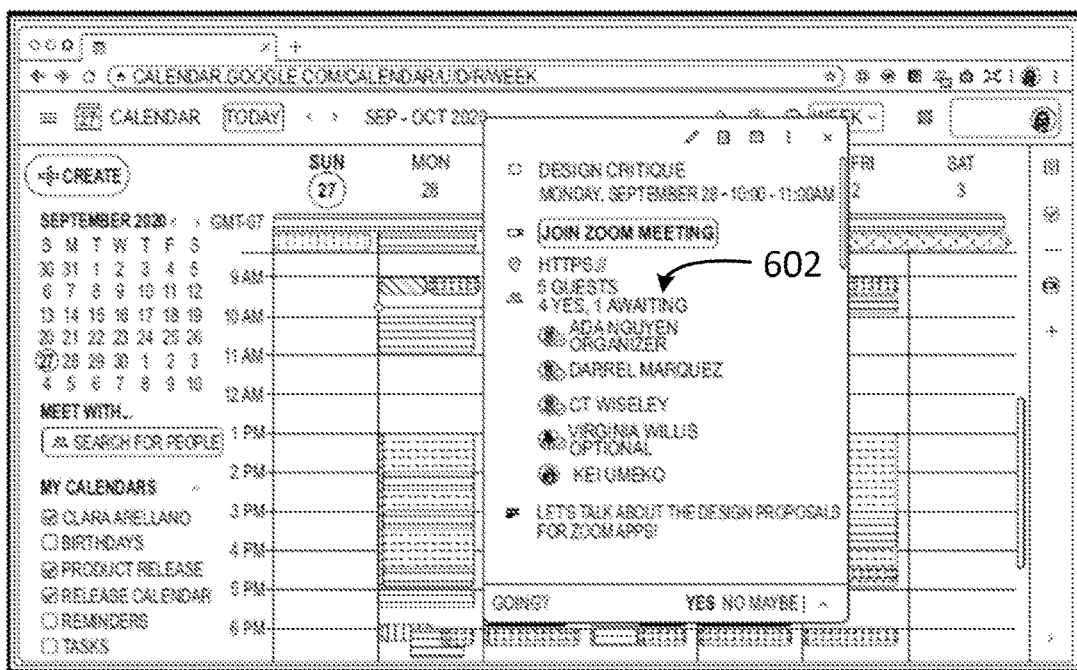
FIG. 6A is a diagram illustrating one example embodiment of a user interface 600 for scheduling a meeting among meeting participants.

Referring to FIG. 6A, the diagram illustrates one example embodiment of a user interface 600 for scheduling a meeting among meeting participants. This diagram illustrates another embodiment of initiating a meeting via a calendaring interface. In this embodiment, a host participant may send a calendar invite to various meeting attendees 602. The calendar invite may include a link or other information regarding a planned meeting. Meeting participants may use the meeting link to join or access a meeting. The initiated meeting then would be conducted as previously described with regard to FIGS. 5B-5D.

In this example, however, the initiated meeting may not have an association to any messaging channel. Since the meeting was not initiated from a messaging channel as may be done with the messaging interface 500 of FIG. 6A, the processing engine 102 may not be able to dynamically post a meeting summary component to a known messaging channel.

Figure 6B:
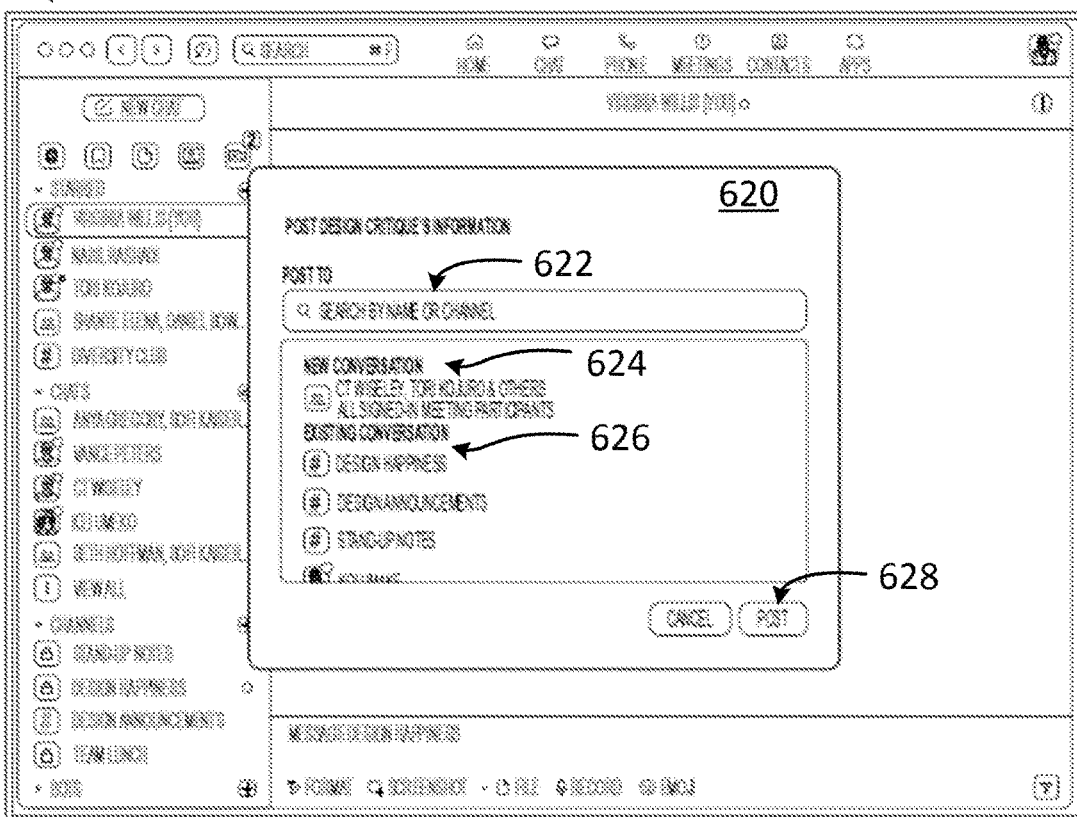
FIG. 6B is a diagram illustrating one example embodiment of a messaging interface 610 of a messaging platform including an interface 620 for posting a meeting summary component to a messaging channel.

Referring to FIG. 6B, the diagram illustrates one example embodiment of a messaging interface 600 including an interface 620 for posting a meeting summary component to a messaging channel. In the situation of an unknown messaging channel, after the meeting has been terminated, the communication interface module 182 may present a messaging channel selection interface 620 to the host participant for posting of a meeting summary component 630.

The messaging channel selection interface 620 may provide search control where a user may input a name or channel. For example, in response to text input into the search control 622, messaging channel selection interface may display messaging channels matching search criteria input into the search control 622.

The messaging channel selection interface 620 may provide functionality to generate a new messaging channel of conversation. For example, the processing engine 102 may display a new conversation selection option 624. The interface 620 may display some or all of the meeting participants. In response to a selection of the new conversation selection option, the communication system 100 may automatically create a new conversation or messaging channel in the messaging platform where all of the meeting participants have access to the new conversation or messaging channel via messaging interface 610, 500. After the new conversation or messaging channel is created, the summary component generation module 176 generates and posts a meeting summary component to the newly created conversation or messaging channel.

The messaging channel selection interface 620 may list one or more messaging channels related to a messaging interface 610. The list of messaging channels may be limited to only those messaging channels where the host participant has permission or access to post to the messaging channel. For example, interface 620 lists existing conversation (i.e., messaging channels 628) of "Design Happiness", "Design announcement", "Stand-up notes", etc. The user interface 620 may receive an input for the selection of one of the listed messaging channels. In response to receiving a selection of the "Post" option 628, a meeting summary component would be posted to the selected messaging channel. While channel selection interface 620 is described with the example of starting from a meeting interface 600, the functionality of messaging channel selection interface 620 may be used with regard to the embodiments of FIGS. 5F-5J. Instead of posting to a predetermined messaging channel, the selection interface 620 may be presented to allow a host participant to post to selected messaging channel.

In one mode of operation, the messaging channel selection module 178 may automatically select one or more messaging channels where the meeting summary component could be posted. For example, the system may compare the user accounts of the meeting participants to user accounts associated with various messaging channels. Where the messaging channel selection module 178 determines a match for some or all of the user accounts for the meeting and a messaging channel, the processing engine 102 may display the particular matched messaging channel(s) for selection by the host participant. This list of messaging channels may be displayed within the prompt in descending order of relevance. The relevance may be based at least on a quantity of participants associated with the messaging channel. Moreover, for each meeting participant and for each messaging channel, messaging channel selection module 178 may determine a per-participant relevance score based at least on an amount that the host participant has engaged in messaging with the participant on the messaging channel, wherein the relevance for each messaging channel is based at least on a sum of the per-participant relevance scores for the messaging channel.

In response, to a selection of a messaging channel, the processing engine 102 would post the meeting summary component to selected messaging channel (as described above).

Exemplary Computer System

Figure 7:
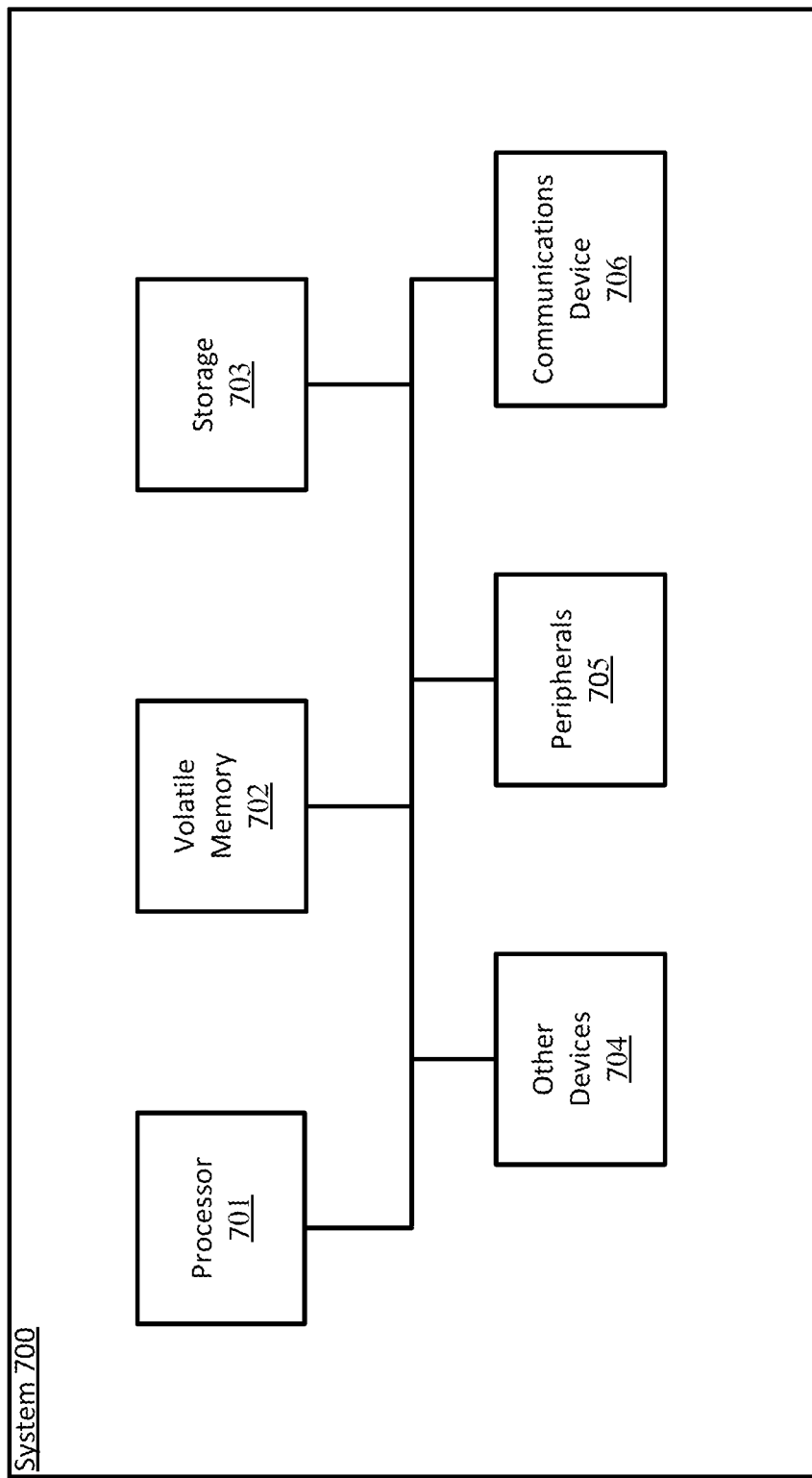
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 1305 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for sharing meeting assets within a messaging platform, comprising:
   receiving one or more meeting assets associated with a meeting conducted via a video communication platform, the video communication platform providing video and textual chat communication among meeting participants;
   storing the received one or more meeting assets in a storage repository;
   generating a meeting summary component configured to be displayed within the messaging platform, the messaging platform comprising one or more messaging channels, and the meeting summary component comprising at least a description of the meeting and a description of one or more meeting assets, the video communication platform providing textual chat communication separate from the messaging platform;
   determining a matched messaging channel for some or all of the participants of the meeting and of the one or more messaging channels;

selecting one or more messaging channels of the messaging platform for displaying the meeting summary component, the one or more messaging channels including the matched messaging channel;
posting, via a user interface of the messaging platform, the meeting summary component to the one or more selected messaging channels;
receiving, via the user interface of the messaging platform, an input selecting the meeting summary component; and
in response to receiving the input selecting the meeting summary component, retrieving from the storage repository the one or more meeting assets.

2. The method of claim 1, wherein the selecting one or more of the messaging channels of the messaging platform for display comprises:
receiving, via the user interface of the messaging platform, an input for the selection of one or more of displayed messaging channels in which to post the meeting summary component.

3. The method of claim 1, further comprising:
initiating the meeting using the video communication platform from a pre-existing messaging channel of the messaging platform for a group of meeting participants associated with the pre-existing messaging channel.

4. The method of claim 3, wherein the selected one or more messaging channels includes the pre-existing messaging channel of the messaging platform from which the meeting was initiated.

5. The method of claim 1, further comprising:
determining whether one or more existing messaging channels of the messaging platform are associated with the meeting based on at least an evaluation of whether a group of meeting participants of the meeting are also participants of the one or more messaging channels.

6. The method of claim 1, wherein the meeting summary component is a graphical card configured to be displayed within a messaging channel of the messaging platform.

7. The method of claim 1, wherein the meeting summary component comprises a description of the meeting, a time of the meeting and a listing of the one or more meeting assets.

8. The method of claim 1, further comprising:
providing for display a listing of matched messaging channels for selection by a host participant, where the matched messaging channels include respective messaging channels where the participants of the meeting are also participants of the one or more messaging channels; and
in response to receiving a selection of one of the matched messaging channels, posting the meeting summary component to the selected messaging channel.

9. The method of claim 8, wherein the matched messaging channels are listed in order of relevance based on at least quantity of meeting participants being associated with a respective messaging channel.

10. A communication system comprising one or more processors configured to perform operations including:
receiving one or more meeting assets associated with a meeting conducted via a video communication platform, the video communication platform providing video and textual chat communication among meeting participants;
storing the received one or more meeting assets in a storage repository;
generating a meeting summary component configured to be displayed within a messaging platform, the messaging platform comprising one or more messaging channels, and the meeting summary component comprising at least a description of the meeting and a description of one or more meeting assets, the video communication platform providing textual chat communication separate from the messaging platform;
determining a matched messaging channel for some or all of the participants of the meeting and of the one or more messaging channels;
selecting one or more messaging channels of the messaging platform for displaying the meeting summary component, the one or more messaging channels including the matched messaging channel;
posting, via a user interface of the messaging platform, the meeting summary component to the one or more selected messaging channels;
receiving, via the user interface of the messaging platform, an input selecting the meeting summary component; and
in response to receiving the input selecting the meeting summary component, retrieving from the storage repository the one or more meeting assets.

11. The system of claim 10, wherein the selecting one or more of the messaging channels of the messaging platform for display comprises:
receiving, via the user interface of the messaging platform, an input for the selection of one or more of displayed messaging channels in which to post the meeting summary component.

12. The system of claim 10, the operations further comprising:
initiating the meeting using the video communication platform from a pre-existing messaging channel of the messaging platform for a group of meeting participants associated with the pre-existing messaging channel.

13. The system of claim 10, wherein the selected one or more messaging channels includes the pre-existing messaging channel of the messaging platform from which the meeting was initiated.

14. The system of claim 10, the operations further comprising:
determining whether one or more existing messaging channels of the messaging platform are associated with the meeting based on at least an evaluation of whether a group of meeting participants of the meeting are also participants of the one or more messaging channels.

15. The system of claim 10, wherein the meeting summary component is a graphical card configured to be displayed within a messaging channel of the messaging platform.

16. The system of claim 10, wherein the meeting summary component comprises a description of the meeting, a time of the meeting and a listing of the one or more meeting assets.

17. A non-transitory computer storage medium that stores executable program instructions that when executed by one or more computing devices, configures the one or more computing devices to perform operations comprising:
receiving one or more meeting assets associated with a meeting conducted via a video communication platform, the video communication platform providing video and textual chat communication among meeting participants;
storing the received one or more meeting assets in a storage repository;
generating a meeting summary component configured to be displayed within a messaging platform, the messaging platform comprising one or more messaging channels, and the meeting summary component comprising at least a description of the meeting and a description of one or more meeting assets, the video communication platform providing textual chat communication separate from the messaging platform;

determining a matched messaging channel for some or all of the participants of the meeting and of the one or more messaging channels;

selecting one or more messaging channels of the messaging platform for displaying the meeting summary component, the one or more messaging channels including the matched messaging channel;

posting, via a user interface of the messaging platform, the meeting summary component to the one or more selected messaging channels;

receiving, via the user interface of the messaging platform, an input selecting the meeting summary component; and in response to receiving the input selecting the meeting summary component, retrieving from the storage repository the one or more meeting assets.

18. The non-transitory computer storage medium of claim 17, wherein the selecting one or more of the messaging channels of the messaging platform for display comprises:

receiving, via the user interface of the messaging platform, an input for the selection of one or more of displayed messaging channels in which to post the meeting summary component.

19. The non-transitory computer storage medium of claim 17, wherein the operations further comprise:

initiating the meeting using the video communication platform from a pre-existing messaging channel of the messaging platform for a group of meeting participants associated with the pre-existing messaging channel.

20. The non-transitory computer storage medium of claim 19, wherein the selected one or more messaging channels includes the pre-existing messaging channel of the messaging platform from which the meeting was initiated.

21. The non-transitory computer storage medium of claim 17, wherein the operations further comprise:

determining whether one or more existing messaging channels of the messaging platform are associated with the meeting based on at least an evaluation of whether a group of meeting participants of the meeting are also participants of the one or more messaging channels.

22. The non-transitory computer storage medium of claim 17, wherein the meeting summary component is a graphical card configured to be displayed within a messaging channel of the messaging platform.

23. The non-transitory computer storage medium of claim 17, wherein the meeting summary component comprises a description of the meeting, a time of the meeting and a listing of the one or more meeting assets.

* * * * *